Aug. 13, 1957  F. LYIJYNEN  2,802,510
PRESS FOR PRESSING LAMINATED MATERIALS
Filed Nov. 7, 1951  2 Sheets-Sheet 1

INVENTOR.
Fred Lyijynen.
BY
Elmer Jamison Gray
ATTORNEY.

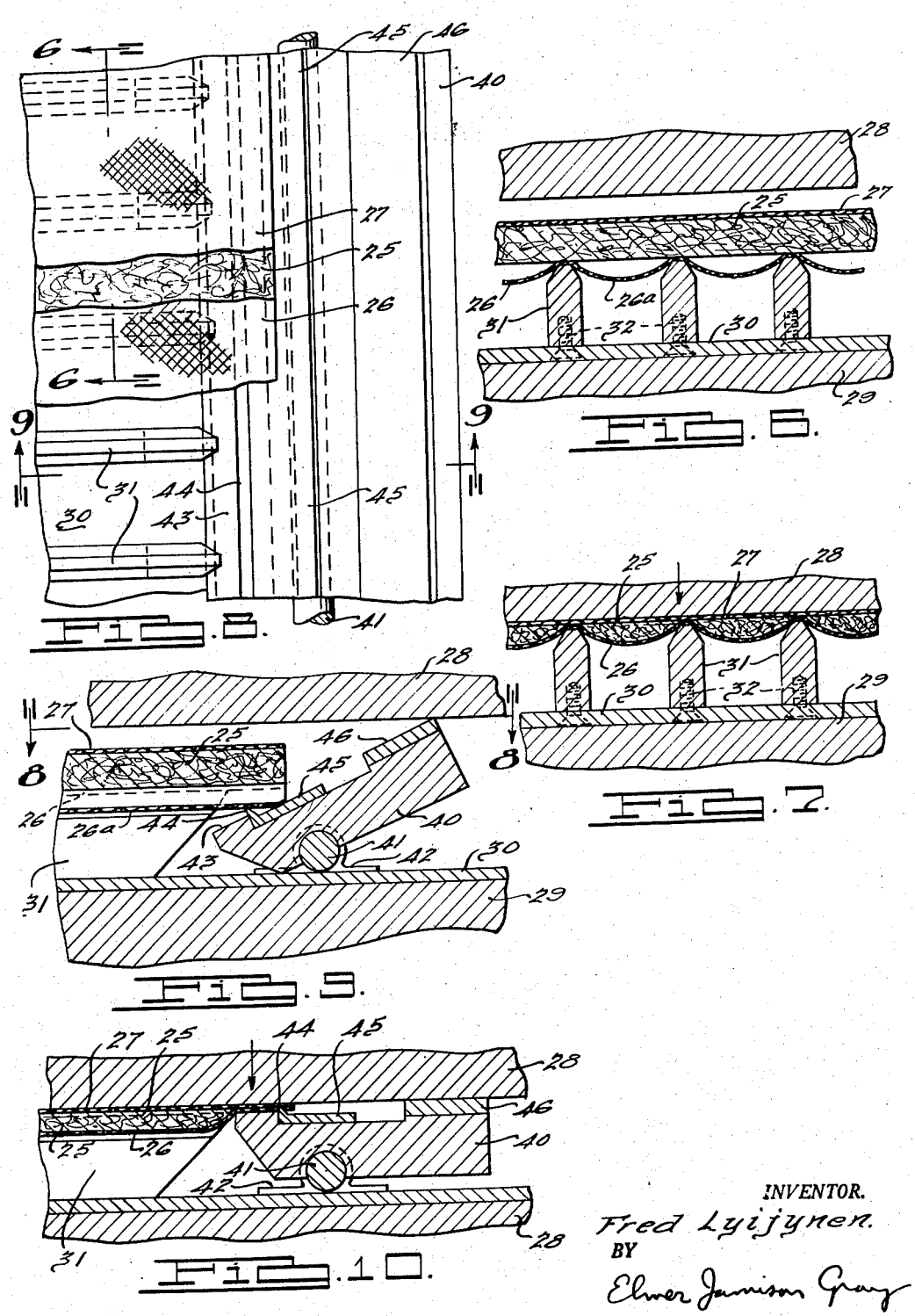

United States Patent Office 2,802,510
Patented Aug. 13, 1957

2,802,510

PRESS FOR PRESSING LAMINATED MATERIALS

Fred Lyijynen, Detroit, Mich., assignor, by mesne assignments, to Chrysler Corporation, a corporation of Delaware Application November 7, 1951, Serial No. 255,191

6 Claims. (Cl. 154—1)

This invention relates to a laminated upholstered structure or panel and to a method and apparatus for manufacturing the same, the structure being particularly though not exclusively adapted for covering automobile seats and seat-backs.

An object of the invention is to provide an improved flexible laminated upholstery structure comprising a padding layer interposed between cover and foundation layers, the layers being compacted and bonded together along a marginal strip and also along a plurality of generally parallel grooves depressed into the cover layer and spaced by upholstered areas extending transversely to said marginal strip.

Preferably in this construction, the marginal strip is arranged so as to lie adjacent an edge of the seat or seat-back to be covered and is accurately trimmed along its outer edge to a uniform width to provide a compacted triple thickness outer guide edge for a sewing machine guide or follower. The adjacent ends of the upholstered areas terminate along a line parallel to said outer guide edge, which may thus be employed to guide a sewing machine follower and to facilitate the sewing of a facing cloth to the marginal strip. The facing cloth is provided to cover side portions of the seat or seat-back and is arranged on the cover layer of the laminated structure or panel with an edge portion overlying the aforesaid marginal strip and directed edgewise outward thereof. The facing cloth is then sewed to the marginal strip along the aforesaid line of termination of the upholstered areas, the outer guide edge of the strip parallel to said line permitting the sewing to be accomplished quickly and accurately to afford a neat seam. Thereafter the facing cloth is folded outward along the seam to cover the latter and the marginal strip and to comprise a side covering for the seat or seat-back.

Another object is to provide an improved laminated structure of the foregoing nature wherein the several layers are compacted and bonded together along the grooves and marginal strip as aforesaid by means of a comparatively flexible or pliable bonding agent applied as an aqueous varnish comprising a mixture of a rubber cement and a partially polymerized phenolic resin, the rubber cement comprising a major portion of the mixture by weight and consists of approximately three-fourths latex and one-fourth rosin or colophony, the varnish being applied to the layers at the regions to be bonded together and thereafter cured to complete the polymerization of the resin by the application of heat and pressure during the process of compacting the grooves and marginal strip.

In the fabrication of a laminated cover structure or panel of the foregoing nature, wherein the cover layer is depressed into the underlying layers along a plurality of generally parallel grooves extending transversely to a marginal strip also depressed into the cover layer, the cover layer seen along any section line through the upholstered areas and parallel to the marginal strip will have a generally scalloped appearance, whereas the cover layer will be straight along a similar parallel section line through the marginal strip. Inasmuch as the same amount of cover-layer material must exist along either section line, difficulty has been experienced heretofore in the fabrication of such a structure without causing gathering and puckering of excess material of the cover layer along the marginal strip.

Other important objects of the present invention are to provide an improved method or process for fabricating a laminated structure of the foregoing nature so as to eliminate or render unobjectionable the gathering or puckering of the cover layer along the marginal or border strip, and to provide a simple efficient apparatus for carrying out the improved method.

In brief the method comprises arranging the unpressed layers in their superimposed relation with the cover layer arranged loosely against the lower die members, and progressively pressing the grooves into the cover and padding layers so as to compact and bond the layers together at the regions of the grooves thereby leaving the intervening unpressed areas in the form of parallel pipes or upholstered portions. Simultaneously during the pressing operation the marginal portions of the layers are progressively pressed or compacted to provide a flat compacted border or marginal strip extending continuously around four sides of the panel. The progressive pressing of the strip occurs in delayed relation with respect to the progressive pressing of the grooves. Thus, as excess material along the length of the marginal or border strip tends to form wrinkles or gatherings upon formation of the grooves, the wrinkles or gatherings are distributed uniformly along the length of the strip by the progressively increasing pressure applied to compact the strip and are thereby smoothed out and rendered unobjectionable. In one application of the method the pressure applied progressively to form the marginal strip is directed both toward the cover layer and outward endwise of the grooves during the initial pressing operation, so as to pull the edge of the cover layer outward and to facilitate the uniform distribution of wrinkles or gatherings tending to form along that edge.

Another object of the invention is to provide an apparatus for carrying out the foregoing process comprising opposed upper and lower press jaws or members adapted to receive the unpressed laminated material therebetween and being relatively movable toward each other in the pressing operation to press the material therebetween, the lower press member having a plurality of generally parallel raised depression forming ribs arranged to opposite the upper press member and press said grooves into the cover layer during the pressing operation. A swinging press or die member having an edge-pressing element extending transversely to said ribs is pivoted on a portion of the press fixed with respect to the lower press member to swing the edge-pressing element upward in opposition to the upper press member and into pressing engagement with the cover layer to form said depressed marginal strip. In this construction, means are also provided for swinging the edge pressing element progressively against the cover layer simultaneously but in delayed relation to progressive relative movement of said upper and lower press members toward each other in the pressing operation, thereby to distribute uniformly along the length of the strip any wrinkles or gatherings tending to form as a result of the progressive formation of said parallel grooves.

A more specific object is to provide an apparatus of the foregoing nature wherein the swinging press member is pivoted on the lower press member to swing about an axis located parallel to said strip and edge pressing element and also located endwise outward of said ribs and below the upper edges of the latter. The edge-pressing element is arranged inward of the axis so as to swing upward and outward with respect to the ribs into pressing engagement with the cover layer, thereby to pull the latter outward by frictional engagement therewith during the pressing operation. Extending outward from the axis of the swinging press member is an arm of the latter arranged to be engaged by the upper press member and to be swung downward thereby upon relative movement of the upper and lower press members toward each other in the press operation, thereby to cause the aforesaid upward and outward swinging of the inner edge-pressing element into pressing engagement with the cover layer to form the marginal strip.

Another object is to provide such a construction wherein a cut-off edge is carried by the swinging press member adjacent and outward of the edge-pressing element, so as to swing upward and outward therewith in the pressing operation. The cut-off edge projects upward of the edge-pressing element at a final pressing position, so as to pierce the laminated structure along the length of the depressed marginal strip and trim the latter to form the aforesaid outer guide edge for a sewing machine guide or follower. Likewise the cut-off edge, projecting upward of the edge pressing element, frictionally engages the cover layer to drag the latter outward during movement of the swinging press member to the final pressing position, so as to facilitate uniform distribution of wrinkles or gatherings along the strip in the manner above outlined.

Other objects of this invention will appear in the following description and appended claims, reference being had to the accompanying drawings forming a part of this specification wherein like reference characters designate corresponding parts in the several views.

Fig. 6 is a fragmentary vertical section taken through the press apparatus in the direction of the arrows along the line 6—6 of Fig. 8, illustrating the method of arranging the laminations in the press prior to the bonding operation.

Fig. 7 is a view similar to Fig. 6, but showing the press apparatus at the pressing position during formation of the panel.

Fig. 8 is a fragmentary plan view with portions broken away, showing the lower press members adjacent an edge of the laminated material overlying the ends of the depression forming ribs, taken in the direction of the arrows along the line 8—8 of Fig. 9.

Fig. 9 is a vertical section taken in the direction of the arrows along the line 9—9 of Fig. 8, showing the press apparatus in the loading position as shown in Fig. 6.

Fig. 10 is a vertical sectional view similar to Fig. 9, but showing the press apparatus at the pressing position as illustrated in Fig. 7.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
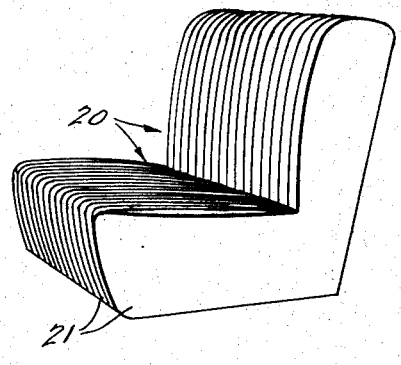
Fig. 1 is a perspective view of an automobile seat and seat-back covered by a laminated upholstery panel embodying the present invention.
Figure 2:
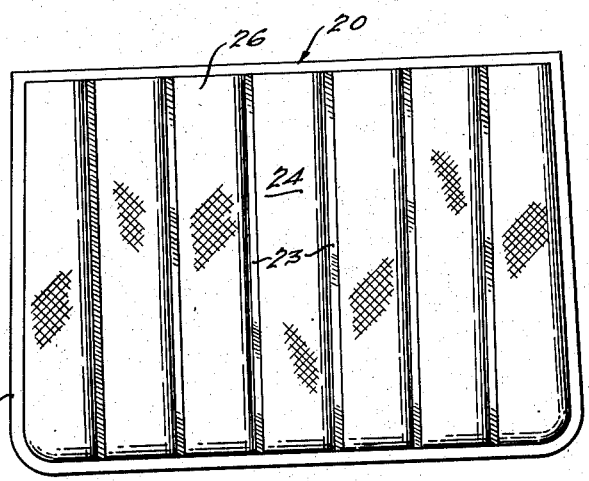
Fig. 2 is a plan view of the panel prior to being sewed to the facing cloth.

Referring to the drawings, a panel structure embodying the present invention is illustrated by way of example comprising a two part cover for an automobile seat and seat-back structure, Fig. 1, including a laminated upholstered part indicated generally by the numeral 20 covering the upper surface of the seat and forward surface of the back, and a facing layer 21 suitably stitched to marginal portions of the upholstered part 20 and applied to cover the vertical sides of the seat and seat-back. The upholstered part 20 may comprise a unitary structure covering both the seat and back, or as illustrated in Fig. 2, may comprise one portion dimensioned to cover the seat and a separate similar but larger portion formed to cover the back. Also as illustrated in Figs. 1 and 2, the layers of the laminated part 20 are compacted at the region of a marginal strip 22 and along a plurality of generally parallel grooves or pattern lines 23 spaced by uncompressed or upholstered areas 24, as discussed in detail below.

Figure 3:
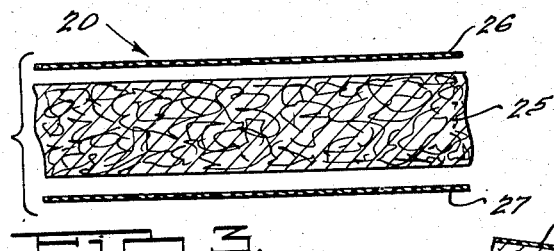
Fig. 3 is a fragmentary exploded sectional view showing the component layers of the laminated structure prior to being bonded together.
Figure 4:
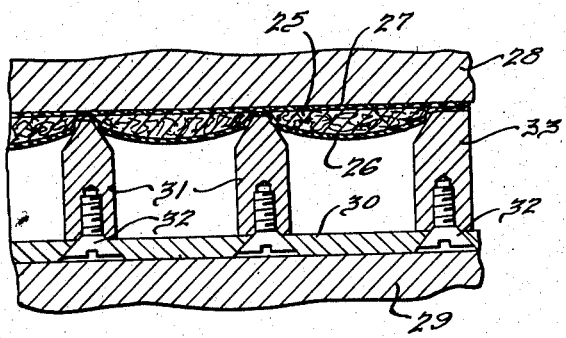
Fig. 4 is a fragmentary vertical sectional view through a press apparatus, showing the latter at the pressing position in the process of forming the grooves and a portion of the marginal strip parallel to the grooves.

As indicated in Fig. 3 the laminated part 20 comprises an intermediate padding or upholstery layer 25 of sponge or foam rubber or wadding or the like, interposed between an upper cover layer 26 and lower foundation layer 27. The latter two layers may comprise any suitable sheeting such as a flexible plastic, cloth, or fabric. The formation of the laminated part 20 and bonding of the layers together along the marginal strip 22 and grooves 23 are accomplished between the opposed heated jaws or press members of a suitable press, as for example a hydraulic press having upper and lower platens or press members 28 and 29, Fig. 4. For the purpose of discussion, the lower member 29 may be considered fixed or stationary and carries a die plate 30 having a plurality of raised depression forming ribs 31 secured to the plate 30 by screws 32. The ribs 31 extend parallel to each other for the desired length of the grooves 23 and are formed along their upper edges, which confront the press member 28, so as to press the grooves 23 into the laminated material during a pressing operation.

The formation of the lateral portions of the marginal strip 22 which are parallel to the grooves 23 offers no particular problem. These portions are formed similarly to the grooves 23 by means of a pair of lateral ribs 33 parallel to the ribs 31, one secured to the plate 30 by screws 32 along each lateral edge of the die structure. The upper press member 28 is provided with a plane pressing surface confronting the upper edges of the ribs 31 and 33 and is movable toward and from the latter in a pressing cycle. Thus with the panel material arranged between the members 28 and 29 and with the cover layer confronting the ribs 31 and 33, these ribs are depressed into the panel upon downward movement of the member 28 to the pressing position, Fig. 4. Simultaneously the panel layers are bonded together, by means of a bonding agent discussed below, along the lines of heat and pressure applied during the pressing operation. Formation of the portions of the strip 22 which are transverse to the grooves 23 is usually complicated by the formation of wrinkles or puckers, as aforesaid, and is discussed in detail below in consideration with Figs. 6-10. Either during or subsequent to the press operation, the outer edge of the strip 22 is accurately trimmed to a uniform width to provide an outer guide edge for the purpose discussed below.

The bonding substance for bonding the laminations together may be applied either to the foundation layer 27 or to the padding layer 25, or to both, and is usually somewhat tacky and of a type that will be cured or polymerized by the heat and pressure of the members 28 and 29 during the press operation. The bonding substance preferably includes, at least in part, a thermosetting resin such as a phenol-formaldehyde or a urea-formaldehyde resin in an intermediate stage of reaction when applied to the laminations, so as to be cured or set permanently when subjected to the heat of the pressing operation for a predetermined period of time. It is desirable that the bonding substance used with upholstery panels for seat and back covers be such as to bond the laminations permanently together along lines or areas which are flexible or pliable. This is particularly important with seat or back cushions which are subjected to deforming or distorting forces due to the weight of the occupant of the seat. Thermosetting resins, especially of the phenolic type, when used as the bonding medium produce undesirably stiff bonding lines or regions which are comparatively brittle and which crack or pucker and eventually produce an unsightly appearance when deformed or bent out of shape.

In accordance with the present invention, relatively flexible and pliable bonding lines or regions are produced by means of a bonding resin comprising as the principal constituents a rubber-like bonding substance mixed with the phenolic resin. As an example, a rubber cement composed principally of approximately three parts of a synthetic or natural rubber or latex and one part of rosin or colophony are utilized. A liquid varnish is prepared by mixing this cement and a phenolic resin in a water carrier, the cement and resin being of the types which are soluble or miscible in water. This resin mixture may comprise, for example, from approximately 5% to 11% by weight of phenolic resin and from approximately 22% to 28% by weight of rubber cement, the balance of the varnish being water. Such a bonding mixture, when heated under pressure, will produce flexible and pliable bonding lines or areas and will withstand the bending or deforming forces to which the seat or back cushion is subjected by the weight of the occupant.

Figure 5:
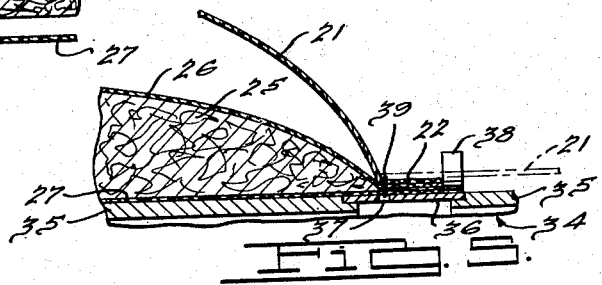
Fig. 5 is a fragmentary sectional view transverse to an edge of the laminated structure, illustrating the process of sewing the facing cloth to the marginal strip.

After pressing the laminated part 20 and trimming the outer edge of the strip 22, the facing cloth 21 which may comprise any suitable fabric, plastic sheet or the like, is suitably stitched to the strip 22 so as to extend outward therefrom and cover the sides of the seat and back structure. By virtue of the compacted triple thickness marginal strip 22, the outer edge of the latter may be successfully used to guide the sewing operation, which may be performed by a sewing machine 34 of any suitable or conventional type. In the sewing operation the formed laminated part 20 is arranged on a work-supporting table 35 of the sewing machine with the marginal strip 22 overlying the bobbin plate 36 and arranged so that the line of the juncture of the inner edge of the strip 22 and adjacent uncompressed or upholstered area 24 overlie the orifice 37 provided in the plate 36 for a sewing needle. Superimposed on the upholstered part 20 in position for the sewing operation is the facing cloth 21 arranged with its edge overlying the strip 22 and directed outward as indicated in Fig. 5. A guide or follower 38 of the machine 34 is positioned adjacent the outer guide edge of the strip 22, so that as the latter moves along the guide 38 during the sewing operation, the facing cloth 21 is stitched at 39 to the strip 22 accurately along the outer edge of the adjacent upholstered area 24.

The assembly is then arranged on the seat structure and the facing cloth 21 is folded outward as indicated in phantom, Fig. 5, so as to cover the seam 39 and marginal strip 22 to complete a neat and attractive cover structure, Fig. 1.

In the usual instance employing cloth or a comparatively inelastic fabric for the cover layer 26, considerable difficulty is experienced, as aforesaid, in the avoidance of wrinkling or gathering of the excess cover layer material along the portion of the marginal strip 22 which is transverse to the grooves 23. In order to overcome this difficulty while utilizing a press apparatus substantially as described thus far, a rocking press member 40 is provided, Figs. 8–10, which is mounted on a pivotal shaft 41 extending transversely to the ribs 31 and parallel to the transverse portion of the depressed strip 22 to be formed. The shaft 41 is journaled in a bracket 42, supported by the die plate 30, so as to pivot about its longitudinal axis located below the upper edges of the ribs 31 and endwise outward thereof, Figs. 9 and 10.

Inward of the axis of the shaft 41, the rocking press member 40 is provided with an edge-forming element 43 adapted to swing upward to a pressing position level with the upper edges of the ribs 33 and arranged to press the portion of the strip 22 which extends transversely to the grooves 23 at one edge of the part 20. A similar rocking press member is provided to press the portion of the strip 22 at the opposite edge of the part 20. Adjacent the outer edge of the element 43, a cut-off blade 44 is provided as an upward projection of a plate 45 secured to the member 40. The cut-off blade 44 is arranged so that its upper edge closely underlies the pressing surface of the upper press member 28 when the latter is at its pressing position, Fig. 10. Accordingly the blade 44 will pierce and trim the overlying layers of the structure 20 and form the aforesaid outer guide edge of the compacted strip 22. A similar blade will be employed with the lateral ribs 33, if desired, so as to trim the outer edges of the corresponding lateral portions of the strip 22 simultaneously as these are pressed by the ribs 33.

Outward of the axis of the shaft 41, the rocking member 40 is provided with a plate 46 arranged so that its upper surface is flush with the pressing surface of the upper press member 28 when the latter is at its pressing position, Fig. 10. Upon upward movement of the press member 28, the outer plate 46 is free to swing upward, whereupon the inner edge-pressing element 43 will swing downward to the position of Fig. 9. Suitable means, such as a spring, may be employed if desired for yieldingly urging the rocking member 40 to the latter position.

In fabrication of the panel 20, the layers 25, 26, 27 are arranged between the press members 28 and 29 as indicated in Fig. 6, with the cover layer 26 confronting the ribs 31, 33. Sufficient excess material of the cover layer 26 is provided between the parallel ribs so as to hang downward in loops 26a, which approximate the final contour of the layer 26 after the bonding operation. Upon downward movement of the upper press member 28 relative to the lower press member 29, the cover layer 26 is progressively pressed into the overlying padding 25 by the ribs 31, 33, which form the grooves 23 and parallel lateral portions of the marginal strip 22 as discussed above. Simultaneously, as the press member 28 descends, the plate 46 engaged by the member 28 is swung downward, causing the element 43 and blade 44 to swing upward. Inasmuch as the latter swing upward from an initial position below the upper edges of the ribs 31 and 33, the spacing between the lower pressing surface of the member 28 and the element 43 will always be greater than the spacing between the pressing surface and the upper edges of the ribs 31 and 33, until the final pressing position is reached. Accordingly the edge-pressing element 43 is moved to the final pressing position in delayed relation with respect to corresponding relative movement between the ribs 31, 33 and press member 28. As a result, the upward pressure on the cover layer 26 exerted by the element 43 will always be less during the press movement than the corresponding pressure exerted by the ribs 31 or 33. As the grooves 23 are progressively formed and the excess material of the cover layer 26 tends to gather and form wrinkles or pleats in the transverse portions of the strip 22, the progressively increasing pressure of the element 43 tends to smooth and to distribute the cover material uniformly along the length of the strip 22. Objectionable localized gathering of the cover material and the formation of wrinkles or pleats are thus avoided.

It is also to be noted that as the element 43 and blade 44 swing upward from the position of Fig. 9 to the pressing position of Fig. 10, these members also swing endwise outward of the ribs 31. In consequence a frictional drag is exerted by these members on the cover layer 26 tending to pull the same endwise outward as the pressing operation progresses. This frictional drag is enhanced by the upwardly projecting edge of the blade 44 and facilitates the progressive smoothing action of the element 43 to eliminate localized gathering of the excess cover layer 26 along the transverse portion of the marginal strip 22.

I claim:

1. In a press apparatus for pressing laminated materials comprising a deformable padding layer interposed between backing and cover layers, upper and lower press members relatively movable vertically toward each other in a pressing action, a plurality of groove forming ribs extending generally horizontally and in the same direction on the lower press member and being cooperable with the underside of the upper press member to form a plurality of generally parallel grooves and intervening upholstered portions in said materials, a third press member pivotally mounted on said lower press member and having a swinging upper pressing surface adapted to swing in said pressing action upwardly and in said direction away from the ends of said ribs from a position below the upper edges of said ribs and adjacent said ends, said pressing surface being cooperable with said underside of the upper press member in said pressing action to compact said material, and means on said upper press member engageable with a portion of said third press member to swing the same in said pressing action.

2. In a press apparatus for pressing laminated materials comprising a deformable padding layer interposed between backing and cover layers, upper and lower press members relatively movable vertically toward each other in a pressing action, a plurality of generally parallel horizontal groove forming ribs on the lower press member, said ribs extending generally in a predetermined direction and being cooperable with the underside of the upper press member to form a plurality of generally parallel grooves and intervening upholstered portions in said materials, a third press member pivotally mounted on the lower press member and having a swinging upper pressing surface located below the upper edges of said ribs adjacent the ends thereof adapted to swing upwardly and in said direction away from said ribs in said pressing action and being cooperable with said underside of said upper press member in said pressing action to compact said material, the pivot axis of said third press member extending transversely of said ribs at a location below the positions of said pressing surface during said pressing action and spaced from said ribs in said direction from said ends, and means on said upper press member engageable with a portion of said third press member to swing the same in said pressing action.

3. A press apparatus according to claim 2 wherein said last named means and portion of said third press member comprise extensions of said upper press member and third member spaced in said direction from said ribs by said axis and engageable with each other upon vertical movement of said upper and lower press members in said pressing action.

4. In a press apparatus for pressing laminated materials comprising a deformable padding layer interposed between foundation and cover layers, first and second press members having confronting pressing surfaces and movable relatively toward each other in a pressing operation to press said materials, the first press member having a plurality of parallel groove forming ribs extending generally in one direction and cooperable with the pressing surface of the second press member to form a plurality of generally parallel grooves and intervening upholstered portions in said materials, and a third press member pivotally mounted on said first press member and having an edge extending transversely of said ribs, said third press member being adapted to swing said edge in said pressing action generally in said direction and toward the pressing surface of the second press member and being cooperable with the latter pressing surface to compact said materials.

5. In a press apparatus for pressing laminated materials comprising a deformable padding layer interposed between foundation and cover layers, first and second press members having confronting surfaces and movable relatively toward each other in a pressing operation to press said materials, the first press member having a plurality of parallel groove forming ribs extending generally in one direction, said ribs having pressing edges intermediate said surfaces and cooperable with the surface of the second press member to form a plurality of generally parallel grooves and intervening upholstered portions in said materials, and a third press member having an edge extending transversely of said ribs adjacent their outer terminal ends at a location intermediate said pressing edges and the surface of the first press member, said third press member being pivotally mounted on said first press member and adapted to swing said edge in said pressing action generally in said direction endwise of said ribs and toward the surface of the second press member and being cooperable with the latter surface to compact said materials.

6. In a press apparatus for pressing laminated materials comprising a deformable padding layer interposed between foundation and cover layers, a pair of opposed press members movable relatively toward each other in a pressing operation to press said materials therebetween, said press members having cooperating groove forming portions effective to form a plurality of generally parallel grooves extending in one direction and spaced by intervening upholstered portions in said materials, a third press member fulcrumed between its ends on one of said pair of press members, one of said ends being cooperable with the other of said pair of press members in said pressing operation to compact said materials, the other of said ends being engageable with said other of said pair of press members in said pressing operation to swing said one end, said third press member being located between said pair of press members with said ends confronting said other press member, and the fulcrum axis of said third press member extending transversely of said direction and also transversely of the direction of relative movement of said pair of press members.

References Cited in the file of this patent

UNITED STATES PATENTS

| 900,276 | Geffers | Oct. 6, 1908 |
| 1,585,642 | Bello | May 25, 1926 |
| 2,166,435 | Haberstump | July 18, 1939 |
| 2,325,986 | Swain et al. | Aug. 3, 1943 |
| 2,326,623 | Crosby | Aug. 10, 1943 |
| 2,500,895 | Davies | Mar. 14, 1950 |
| 2,504,874 | Prance | Apr. 18, 1950 |
| 2,517,069 | Weymouth | Aug. 1, 1950 |
| 2,531,299 | Sawyer | Nov. 21, 1950 |
| 2,541,544 | Rahaim | Feb. 13, 1951 |
| 2,543,582 | Lyijynen | Feb. 27, 1951 |
| 2,573,466 | Lyijynen | Oct. 30, 1951 |

FOREIGN PATENTS

| 363,509 | Germany | Nov. 10, 1922 |